United States Patent Office 3,478,702
Patented Nov. 18, 1969

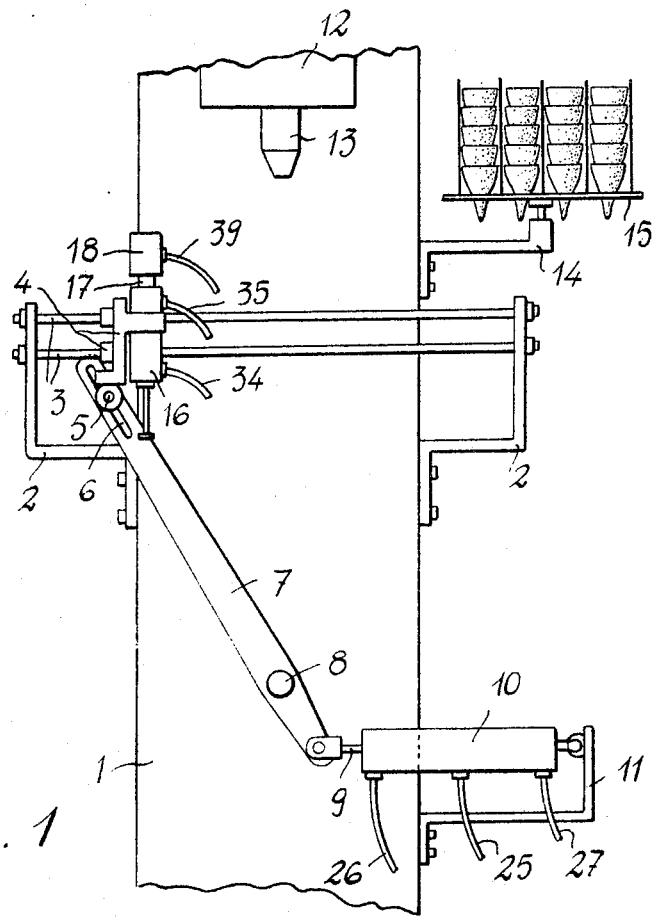
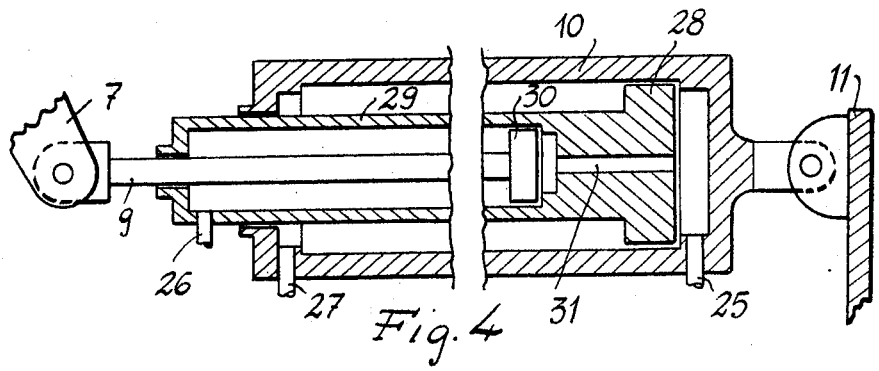

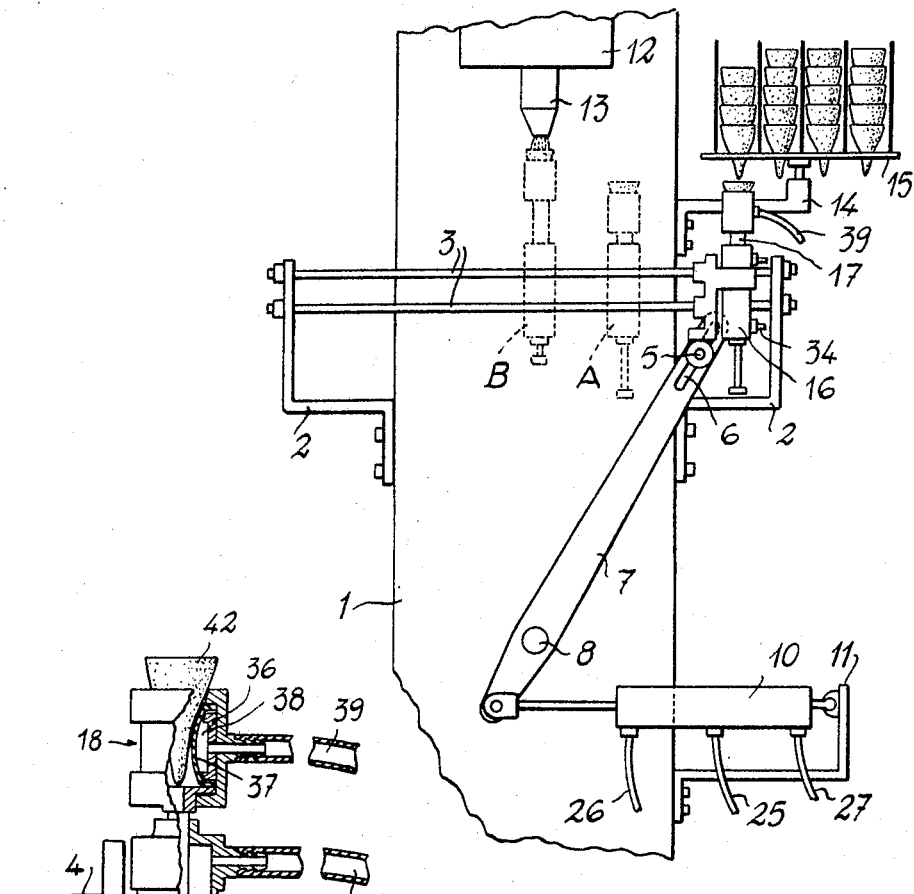
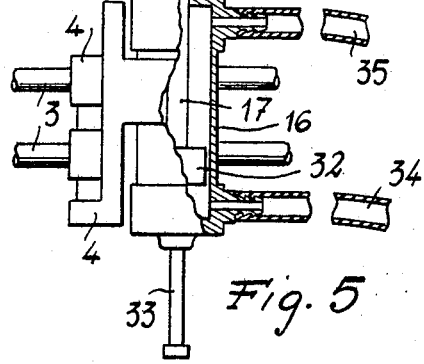
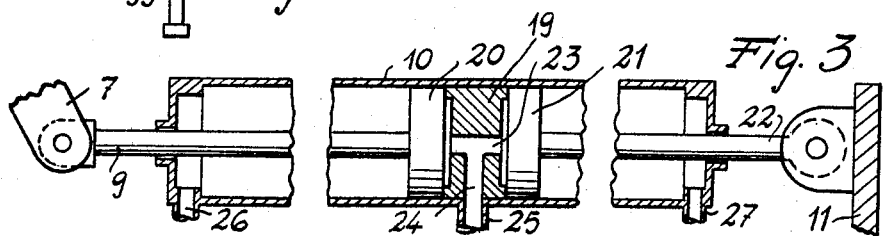
Fig. 2
Fig. 5
Fig. 3

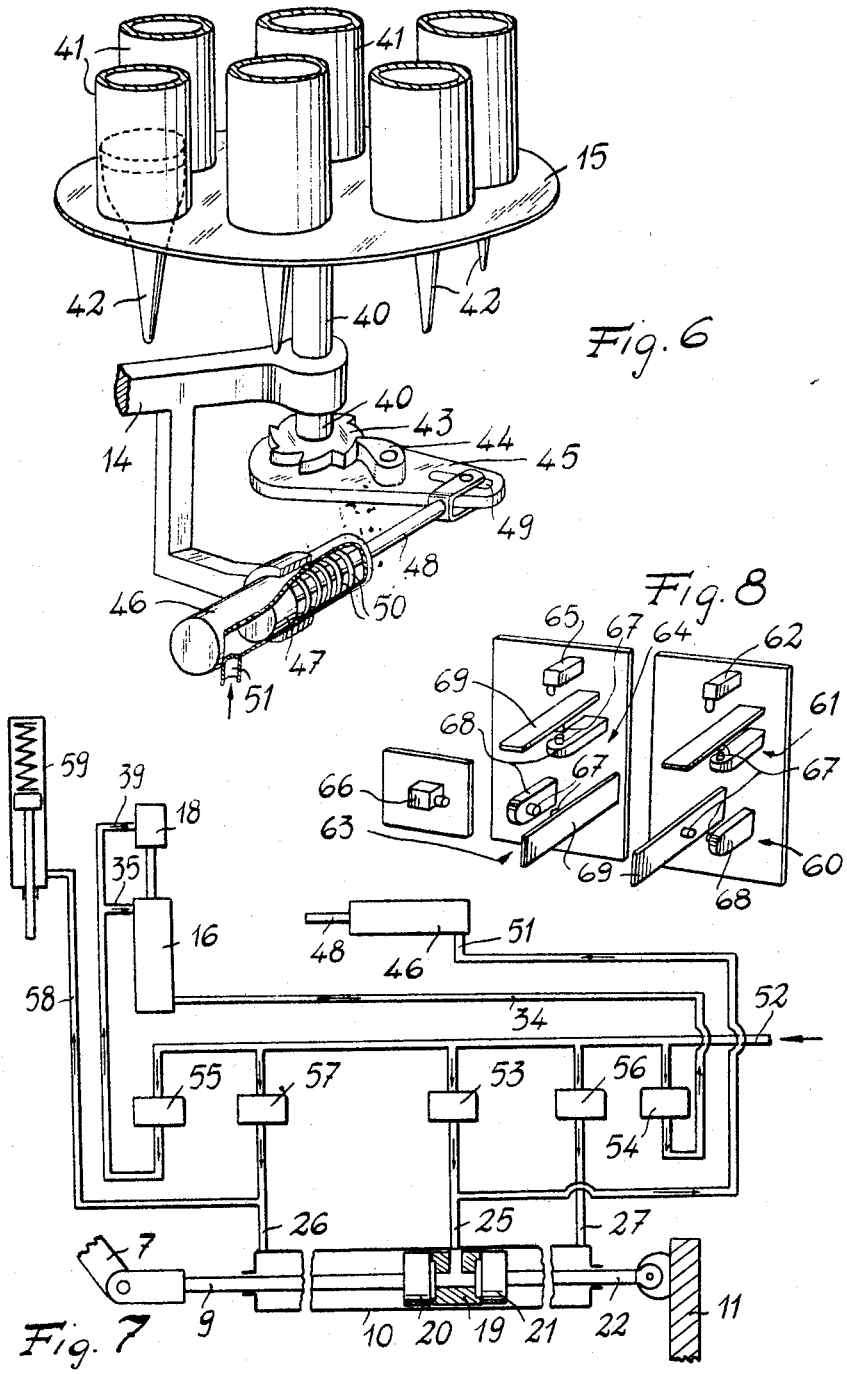

3,478,702
MACHINE FOR DRAWING, FILLING WITH A BULK MATERIAL AND AUTOMATICALLY DISTRIBUTING A CONTAINER
Mario Simonich, Via Legionari di Polonia 25, Bergamo, Italy
Filed Dec. 18, 1967, Ser. No. 691,631
Claims priority, application Italy, Jan. 7, 1967, 1,301/67
Int. Cl. A23g 5/02
U.S. Cl. 107—1      7 Claims

ABSTRACT OF THE DISCLOSURE

A machine comprising a stationary guide on which a slide is movable, an apparatus for instantaneously and continuously producing a predetermined amount of ice-cream, a magazine containing a plurality of wafers or cones stacked on one another, and a gripping member fast with the slide.

The machine comprises driving means and selectors which, upon an initial operation of a starting control, will control the movement of the slide to below the magazine, the withdrawal of a wafer or cone from the magazine through the gripping member, the movement of the slide along with the gripping member and wafer or cone under the delivering nozzle of the ice-cream producing apparatus, the transport and stop of the wafer or cone at an opening in the machine casing and through which the ice-cream containing wafer or cone can be drawn.

---

This invention relates to a machine for drawing, filling with a bulk material, and automatically distributing a container, particularly a container such as a wafer or cone filled with a creamy ice-cream.

As known, when distributing to the public products, particularly products not having a high value and large volume, there is an ever increasing tendency to use automatic machines directly distributing the desired product, without it being necessary to resort to the presence and intervention of proper staff.

Such machines have had a wide spread use, limitedly however where the unitary amount of product to be distributed is of the same volume as the proper volume of a product unit, or where the product is contained in the machines as enclosed in unitary packagings of a predetermined value.

It is the main object of the present invention to provide such a machine which, by merely operating a starting control, is adapted to draw a container among a plurality of containers stored within a magazine, to fill said drawn container with a metered amount of a bulk product, and to present the container filled with said product within reach of the user operating said starting control.

It is a further object to provide a machine of a low cost, simple operation and high reliability, and occupying a comparatively reduced volume.

Particularly, the invention relates to a machine of the above character and wherein the product to be distributed according to a metered amount in each container is a creamy ice-cream as produced and directly delivered by an apparatus forming part of the machine; still more particularly, the machine has an aperture, at which a container filled with creamy ice-cream is automatically presented by merely operating a pushbutton, or introducing a coin into a coin operated device.

The machine comprises an apparatus provided with a nozzle for delivering the material intended to be collected in each container, delivering control means, and a magazine containing a plurality of containers stacked onto one another, and is characterized by comprising a guide extending at least between said apparatus and magazine, a slide movable on said guide, means for controlling the movement of said slide on the guide and stop thereof at predetermined positions at least at said magazine and nozzle, a gripping member carried on said slide and selectively movable to and away from said guide, respectively, means for controlling the translation of said gripping member, and means for operating it to grasp or release one of said containers.

In order that the structure and operation of a machine as above defined will be more clearly understood, an embodiment thereof will now be described by mere way of not restrictive example, reference being made to the accompanying drawings, in which:

FIG. 1 is a diagrammatic side elevational view of the machine shown at rest position;

FIG. 2 is a view similar to that of FIG. 1, but with the moving members of the machine at a movement step thereof;

FIGS. 3 and 4 are axial sectional views for two possible embodiments of an actuating cylinder forming part of the machine;

FIGS. 5 and 6 are diagrammatic, partly sectional views showing two different details of the machine;

FIG. 7 is a diagram for the pneumatic or hydraulic operating circuit of the several moving elements of the machine; and FIG. 8 is a perspective and merely diagrammatic view of the electric contacts for actuating the several electrovalves forming part of the circuit of FIG. 7.

First referring to FIGS. 1 and 2, it is seen that the machine essentially comprises a rigid carrier structure 1, supporting through two brackets 2 two bars 3 straight and parallel to each other, forming a guide on which a slide is mounted and movable, with which slide 4 a pin 5 is fast and freely inserted in an elongated slot 6 at an end of a lever 7 pivoted on a pin 8 fast with structure 1.

The free end of stem 9 of a piston movable within a cylinder 10 is hinged to the other end of lever 7, said cylinder being supported at its end opposite that from which said stem 8 projects by a bracket 11 also fast with said structure 1.

An apparatus 12 for producing and delivering predetermined amounts of creamy ice-cream through a nozzle 13 is fast with the top of structure 1; a further bracket 14 is also fast with said structure 1, said bracket 14 freely rotatably supporting a disc 15 supporting a plurality of cylindrical tubes circumferentially arranged about the axis of rotation for said disc, each of which forming a magazine and containing a plurality of ice-cream wafers or cones stacked onto one another.

Finally, a cylinder 16 is fast with said slide 4, from the upper end of which cylinder a stem 17 for a piston movable within the cylinder projects, a gripping member 18 for grasping and fixedly holding one of the above wafers or cones being fast with said stem 17.

FIG. 3 shows a longitudinal section for an embodiment of cylinder 10; as seen from this figure, a disc-like body 19 is fixed within said cylinder 10 at a predetermined location, the disc-like body dividing the inner cavity of the cylinder into two chambers, within one of which a piston 20 fast with said stem 9 is movable, and within the other of which a piston 21 is movable, this latter piston being fast with an end of a stem 22, the other end of which projects from cylinder 10 and is hinged to said bracket 11, as clearly shown in the drawing.

The disc-like body 19 has an axial hole 23 connecting to a flexible tubular member 25 through a radial hole 24.

The cylinder chamber on the lefthand side of said piston 20 relative to FIG. 3 has a hole, through which said chamber communicates with a flexible tubular member 26 and similarly the chamber on the right-hand side of piston 21 has a hole communicating with a further flexible tubular member designated by reference numeral 27.

By introducing a pressurized fluid, such as air or a liquid, into the flexible tubular member 25, said two stems 9 and 22 are caused to project from cylinder 10, that is, the two ends of stems 9 and 22 externally of cylinder 10 are caused to move away, or, in other terms, a clockwise rotary movement is transmitted to lever 7 about pin 8, and after all a left to right movement to slide 4 on bars 3. Obviously, an opposite movement will be provided by introducing pressurized fluid into the cylinders through the tubular members 26 and 27.

In FIG. 4 there is shown a modified embodiment for the cylinder of FIG. 3, and in such figure some of the reference numerals used in FIG. 3 have been used for evidence and simplicity.

A piston 28, fast with an internally hollow stem 29, is accommodated within said cylinder 10 and movable therein; a piston 30 is accommodated and movable within the cavity of stem 29, said piston 30 being fast with stem 9, the free end of which projecting from the cavity of stem 29 is pivoted to lever 7. A hole 31 passes through said piston 28 and connects the chamber on the right of piston 28 with the chamber on the right of piston 30; still for simplicity of description, in FIG. 4 there have been designated by reference numerals 25, 26 and 27, respectively, the tubular members communicating with the interior of the chambers in said cylinder 10 and stem 29.

Reference is now made to FIG. 5, which is an enlarged and partly sectional view showing the detail comprising slide 4 with cylinder 16 and gripping member 18; as clearly seen from the figure, said cylinder 16 is fast with said slide 4 and accommodates a moving piston 32, from the lower or bottom face of which a guide-like stem 33 projects and from the upper or top face of which a stem 17 projects, said member 18 being fast with the free end of said stem 17.

Piston 32 divides cylinder 16 into two chambers, the lower one of which communicating with a hose 34 and the upper one of which communicating with a hose 35.

Member 18 is formed of several metal elements threaded on one another and comprises an annular body member 36, the lips of which project inwardly of member 18, and an also annular resilient diaphragm 37 having edges tightly secured to member 18 and defining along with said body member 36 an annular chamber 38 communicating with a hose 39: by introducing fluid under pressure into the annular chamber 38, said diaphragm 37 will deform by swelling inwardly of said member 18, that is moving to the position as shown in FIG. 5.

Finally, it should be noted that the upper end of member 18 is open to enable a body to be introduced into the space defined by diaphragm 37.

In FIG. 6 the supporting disc for the magazines containing the wafers or cones intended to receive the ice-cream as produced by apparatus 12 is shown in a diagrammatic and perspective view. Bracket 14 freely rotatably carries an upright shaft 40, the upper end of which is fast with the disc 15 carrying, in the case as shown in the figure, six tubular magazines 41 of a character well known in this technique, and containing a plurality of wafers or cones 42 stacked on one another so that the lower end of the lowermost wafer or cone in each magazine will project below said disc 15.

The wafers or cones can be unthreaded one at a time from the bottom of each magazine, the wafer or cone, which is above the wafer or cone being removed, being retained in each magazine along with all the other wafers or cones superimposed thereon, in a manner well known in this technique.

A gear wheel 43 is keyed on shaft 40 and engaged by a pawl pivoted on a lever 45, which is in turn freely rotatably mounted on said shaft 40. Bracket 14 also carries a cylinder 46 accommodating a piston 47 movable therein and fast with a stem 48, the free end of which carries a vertical pin accommodated within an elongated groove 49 formed in said lever 45. Within said cylinder 46 there is accommodated a spring 50 encircling stem 48 and operating on piston 47 to urge it leftwards as seen in FIG. 6. The chamber being defined within cylinder 46 by the left face of piston 47 communicates with a tube 51.

As previously mentioned, the apparatus 12 is of a well known type in this technique, and more particularly the apparatus is such that, upon closure of a starting contact, a predetermined amount of creamy ice-cream is produced and ejected through nozzle 13, the operation of the apparatus and the opening period of nozzle 13 being controlled by a timing device, the apparatus 12 and the several structural elements forming part thereof not being described in detail herein for sake of simplicity and brevity.

In order to understand the operation of the machine, reference is now made to FIG. 7, wherein the feeding and operating circuit is diagramamtically shown for the several moving elements of said machine. For a clear understanding be it assumed that the several moving elements of the machine as schematically shown in FIG. 7 are operated by air under pressure being introduced at a constant pressure through a conduit 52. Reference numerals 53 to 57 designate in the figure four-way electro-valves of a well known type in this technique.

Be it assumed that initially the moving elements of the machine are at the position as shown in FIG. 1, cylinder 10 at the position of FIG. 3, and all of the electro-valves intercepting the passage of air under pressure therethrough.

By introducing a coin into an ordinary and well known coin operated device an electric contact is closed and causes said electro-valve 53 to be operated and thus air under pressure to pass from conduit 52 to tubular member 25; therefrom the air, by passing through holes 24 and 23 of the disc-like member 19 will operate onto the faces of pistons 20 and 21, causing stem 9 to project from cylinder and disc-like member fast with cylinder 10 to move away from piston 21. Thus, lever 7 is rotated about pivot 8 and moves to the position as shown in FIG. 2, with the gripping member 18 located below and particularly on the axis of one of said magazines containing the wafers or cones.

On reaching the position as shown by full lines in FIG. 2, that is below one of said magazines 41, an electric contact is closed, which energizes the electro-valve 54 allowing the passage of air under pressure in conduit 52 to tube 34, thus causing the raising of piston 32 within cylinder 16 and the raising therewith of member 18 until the lower end of wafer or cone 42, projecting below the magazine 41 located on the same vertical as that of said gripping member 18, is inserted within the cavity in said member 18.

At this time, that is at the upper end of its upward travel, said gripping member 18 closes an electric contact which deenergizes said electro-valve 54 and energizes electro-valve 55, through which the air under pressure is supplied from conduit 52 to tubes 35 and 59. The air, penetrating the annular chamber 38 through tube 39, causes diaphragm 37 to be deformed, said diaphragm tightening on the lower portion of wafer or cone 42 inserted in the gripping member and thus being securedly retained thereto. On the contrary, the air being supplied to the interior of cylinder 16 through tube 35 will cause piston 32 to be lowered, that is said gripping member 18 to be moved away from said disc 15 along with said wafer or cone 42 retained to diaphragm 37.

On lowering, said gripping member 18 will close an electric contact de-energizing electro-valves 53 and 55 and energizing electro-valve 56, through which air under pressure is supplied into the tubular member 27 and from there into cylinder 10, causing said cylinder to move relative to piston 21 until the disc-like member 19 stops against said piston 21.

During air introduction into cylinder 10 through said tubular member 27, lever 7 rotates about pivot 8 in a counterclockwise direction with respect to FIG. 2, and cylinder 16 first moves to the position as shown by dashed lines and designated by letter A in FIG. 2, and then to the position designated by letter B, where said cylinder has still been shown by dashed lines. The position of said disc-like member 19 within cylinder 10 is such that when said disc-like member bears on the surface of piston 21 said gripping member 18 and the wafer or cone carried thereby are on the vertical line passing by the centre of nozzle 13. On reaching this position, the gripping member 18 will close an electric contact, through which electro-valve 54 is re-energized, thus causing said member 18 to be raised again until wafer or cone 42 is immediately belonw nozzle 13. At the latter raised position adjacent said nozzle 13, the gripping member 18 will close an electric contact which connects the ice-cream producing and delivering apparatus 12 by starting the timing device associated therewith. Thus, a predetermined amount of ice-cream is caused to exit from said nozzle 13 and is collected in the wafer or cone 42 underlying thereto. As mentioned, the amount of ice-cream being delivered is controlled by a timing device which, after a predetermined operative period, will stop operation of apparatus 12, close said nozzle 13, de-energize electro-valve 54 and energize electro-valve 55 causing said gripping member 18 to be lowered along with the wafer or cone filled with ice-cream.

On completion of its descending travel, said member 18 will close a further electric contact providing for the de-energization of electro-valve 55 and energization of electro-valve 55 through which air pressure is supplied to the tubular member 26 and tube 58. The air entering the cylinder 10 through the tubular member 26 causes piston 20 to move until it stops against the disc-like member 19 (FIG. 7), that is the return of lever 7 to the position as shown in FIG. 1, whereas the air under pressure passing through tube 58 is introduced into a cylinder 59 (FIG. 7) below a piston provided with a stem, an upwardly slidable small door being fast therewith. This small door is not shown in the drawings for the sake of simplicity, being it sufficient to say that it is movable on guides in the machine casing and that said small door will close at lowered position and open at raised position an aperture through which an ice-cream filled wafer or cone, carried by said gripping member 18 at the position of FIG. 1, can be grasped and removed out of the machine. Finally, it should be noted that at this position of FIG. 1, one of the moving elements of the machine holds a microswitch closed, said microswitch controlling the de-energization for all of the electric elements of the machine and the cease of air under pressure supply to conduit 52.

As mentioned, disc 15 carries a plurality of magazines 41. In order that the weight of disc 15, magazines and wafers or cones carried thereby be the most possible evenly distributed about the axis of shaft 40, it is essential that said gripping member 18 will draw a wafer or cone from time to time from a different magazine. As seen from FIGS. 6 and 7, this is done in a very simple manner. Thus, whenever the machine is started and electro-valve 53 is energized, air under pressure is, additionally to the tubular member 25, also introduced into tube 51 and from there into cylinder 46, in which piston 47 moves compressing spring 50 and causing lever 45 to move in a counterclockwise direction (FIG. 6). Pawl 44 engages on one of the teeth in gear wheel 43, which is rotated along with shaft 40 and disc 15 through such an angle that the magazine 41 immediately adjacent the magazine from which a further wafer or cone had been formerly drawn will be arranged above said gripping member 18. When energization of electrovalve 53 ceases, piston 47 will return to rest position and lever 45 rotate clockwise without transmitting, however, any movement to gear wheel 43.

The aforementioned electric contacts may take the form as diagrammatically shown in FIG. 8, in which these contacts have been designated by reference numerals 60 to 66. Each of contacts 60, 61, 63 and 64 have been shown as formed of two conducting points 67 connected to the two terminals of a respective electric circuit to be closed, one of said points being fast with a rigid bar 68, while the other is fast with a flexible sheet 69. Each of the sets of contacts 60, 61 and 62, and 63, 64 and 65 are carried by a plate which is secured to the machine frame. Contact 66 is as well carried by said frame.

Contacts 60, 61, 63 and 64 are operated by two bars projecting from the periphery of the gripping member 18. By moving from left to right during the clockwise movement step of lever 7, one of said bars first interferes with the free edge of sheet 69 for contact 63, causing said sheet 69 to be rightward flexed and thus not closing the respective contact. By still moving rightward, the bar fast with the gripping member interferes with the free edge of sheet 69 forming part of contact 60, said sheet being rightward flexed, bringing the two points 67 of contact 60 to contact, thus energizing electro-valve 54. As said gripping member 18 raises approaching disc 15, the bar fast therewith and maintaining said sheet 69 rightwardly flexed will slide contacting said sheet, while the other bar, also fast with said gripping member and similar to the former, will upward bend, thus disengaging from sheet 69 of contact 61. When the gripping member gets adjacent the upper end of its travel, that bar holding the sheet 69 of contact 60 rightward bent releases from said sheet, whereby the latter returns by resiliency to its rest position shown in FIG. 8. On reaching the end of its upward travel, said gripping member 18 closes the contact 62 formed of a microswitch which energizes electro-valve 55. During descent movement of the gripping member, the bars fast therewith will cause a downward bending of the flexible sheet 69 of contact 61 (which energizes electro-valve 56), while the other bar lowers on the right side of the flexible sheet 69 of contact 60. During the leftward movement of slide 4, that is during the counterclockwise rotation of lever 7, this bar will leftward bend the flexible sheet 69 of contact 60, thereafter releasing therefrom and then still leftward bending the sheet 69 of contact 63 (while the other bar fast with the gripping member disengages from the flexible sheet of contact 61), thus re-energizing electro-valve 54.

The sequence of the closing and opening steps for the other contacts occurs in a wholly similar manner and is herein not particularly described for the sake of brevity.

It is apparent that all of the members as described with reference to the drawings can be replaced by other members of equivalent functions; for instance, it is obvious that the use of lever 7 is not essential for the machine operation, since stem 9 of piston 10 can directly operate on slide 4. It is still apparent, for example, that the wafer or cone can be drawn from the magazine by a suction action exerted on its outer surface by said gripping member, rather than by pressure on it as provided by the described diaphragm 37.

What is claimed is:

1. A machine for drawing, filling with a bulk material, and automatically distributing a container, including an apparatus fitted with a nozzle for delivering said material, delivering control means, and a magazine containing a plurality of containers stacked on one another, comprising a guide extending at least between said apparatus and magazine, a slide movable on said guide, means for controlling the movement of said slide on said guide and the stopping thereof at predetermined positions at least at said magazine and nozzle, a gripping member carried on said slide and selectively movable to and away from said guide, respectively, means for controlling the translation of said gripping member, and means for operating the latter to grasp or to release one of said containers.

2. A machine according to claim 1, wherein said means for controlling the slide movement comprise two rigidly interconnected cylinders, from which two stems project in opposite directions, each of said stems being fast with a piston movable within each of said cylinders, one of the free ends of the stems being connected to the slide, while the other is connected to a stationary location of the machine, the inner cavity for each of the cylinders being connected through flexible tubular members on both sides of the piston therein accommodated with a pressure fluid source, there being also provided valves inserted in said tubular members and control members selectively operable to open and to close said valves.

3. A machine according to claim 1, wherein said means for controlling the slide movement comprise a cylinder housing a moving piston fast with a hollow stem projecting from the cylinder, a piston accommodated and movable within said hollow stem and fast with a stem projecting from said hollow stem, said piston housed within the cylinder having a hole passing throughout the width of said piston and establishing a communication between the cavity of the hollow stem and the cavity of the cylinder, the free end of the stem projecting from said hollow stem and the opposite end of said cylinder being connected one to said slide and the other to a stationary location of the machine, the inner cavities of said hollow stem and cylinder being connected on both sides of the pistons therein accommodated with a pressure fluid source through flexible tubular members, there being also provided valves inserted in said tubular members and control members selectively operable to open and to close said valves.

4. A machine according to claim 1, wherein said magazine is one of a plurality of magazines fast with a disc freely rotatably carried on a rigid shaft, on said shaft there being keyed a gear wheel and there being freely rotably mounted a lever carrying a pawl engaging with said gear wheel, said lever being connected to the end of the stem of a piston accommodated within a cylinder fixed to the machine frame, at least on one side of the piston therein accommodated said cylinder being connected with a pressure fluid source, the supply of which into said cylinder causes the piston to be moved.

5. A machine according to claim 1, wherein said slide carries a cylinder in which a piston is movable and fast with a stem projecting from the upper end of said cylinder, on both sides of the piston therein accommodated said cylinder being connected to a pressure fluid source, means being provided for selectively supplying said fluid above and respectively below said cylinder piston, the upper end of said stem being fast with said gripping member comprising a rigid hollow member, within which a resilient diaphragm is arranged and defines an annular chamber connected to a pressure fluid source through a hose, there being also provided a valve inserted in said hose and control means operable to close and to open respectively said valve.

6. A machine according to claim 1, wherein said slide moves below said magazine by operation of a starting control, thereafter said gripping member raising to the lower end of said magazine, then grasping the lowermost container in the magazine and lowers moving away from said magazine, then said slide along with said gripping member carrying the container drawn from the magazine moves on said guides stopping below said nozzle, thereafter said gripping member raises to said nozzle from which a predetermined amount of material exiting from said apparatus is delivered into the container, and finally, said slide along with said gripping member and material filled container stop adjacent an end of said guides, where said container can be readily drawn.

7. A machine according to claim 1, wherein said bulk material is creamy ice-cream, said apparatus is formed of an apparatus for continuously producing creamy ice-cream, and said container is an ice-cream wafer or cone.

References Cited

UNITED STATES PATENTS

| | | | |
|---|---|---|---|
| 2,728,306 | 12/1955 | Tarr | 107—8 |
| 2,919,724 | 1/1960 | Anderson | 107—1 |
| 3,285,198 | 11/1966 | Hornstein | 107—1 |

WALTER A. SCHEEL, Primary Examiner

R. I. SMITH, Assistant Examiner

U.S. Cl. X.R.

107—8; 141—174